US012377408B2

(12) United States Patent
Jeletic et al.

(10) Patent No.: US 12,377,408 B2
(45) Date of Patent: Aug. 5, 2025

(54) CATALYST, REDOX-SWITCHABLE CATALYST SYSTEM, AND RELATED METHODS INVOLVING HYDROSILYLATION

(71) Applicants: DOW SILICONES CORPORATION, Midland, MI (US); THE BOARD OF TRUSTEES OF THE UNIVERSITY OF ILLINOIS, Urbana, IL (US)

(72) Inventors: Matthew Jeletic, Midland, MI (US); Thomas Rauchfuss, Urbana, IL (US); Yu Zhang, Urbana, IL (US); Husain Kagalwala, Pittsburgh, PA (US)

(73) Assignees: DOW SILICONES CORPORATION, Midland, MI (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 272 days.

(21) Appl. No.: 18/013,886

(22) PCT Filed: Jul. 6, 2021

(86) PCT No.: PCT/US2021/040457
§ 371 (c)(1),
(2) Date: Dec. 29, 2022

(87) PCT Pub. No.: WO2022/010858
PCT Pub. Date: Jan. 13, 2022

(65) Prior Publication Data
US 2023/0347328 A1 Nov. 2, 2023

Related U.S. Application Data

(60) Provisional application No. 63/048,613, filed on Jul. 6, 2020.

(51) Int. Cl.
*B01J 31/00* (2006.01)
*B01J 31/24* (2006.01)

(52) U.S. Cl.
CPC ...... *B01J 31/2409* (2013.01); *B01J 2231/323* (2013.01); *B01J 2531/822* (2013.01)

(58) Field of Classification Search
None
See application file for complete search history.

(56) References Cited

U.S. PATENT DOCUMENTS

2019/0329231 A1 10/2019 Bousquie et al.
2020/0115504 A1 4/2020 Lassig et al.
(Continued)

FOREIGN PATENT DOCUMENTS

CA 2048774 A1 3/1992
CN 110770280 A 2/2020
(Continued)

OTHER PUBLICATIONS

International Search Report for PCT/US2021/040457 dated Oct. 20, 2021, 6 pages.
(Continued)

*Primary Examiner* — Yun Qian
(74) *Attorney, Agent, or Firm* — Warner Norcross + Judd LLP

(57) ABSTRACT

A catalyst for hydrosilylation is disclosed. The catalyst comprises a complex having a certain formula. A redox-switchable catalyst system for preparing the catalyst is also disclosed. The redox-switchable catalyst system comprises a redox-switchable catalyst and a reducing compound. The reducing compound reduces a formal oxidation state of the redox-switchable catalyst to give the catalyst, where the former is generally inactive in catalyzing hydrosilylation and the latter is catalytically active. A composition compris-
(Continued)

ing the catalyst and/or the redox-switchable catalyst system, and a hydrosilylation reaction product, are also disclosed.

16 Claims, 2 Drawing Sheets

(56) References Cited

U.S. PATENT DOCUMENTS

| 2020/0140618 A1 | 5/2020 | Gohndrone et al. |
| 2020/0230585 A1 | 7/2020 | Basu et al. |

FOREIGN PATENT DOCUMENTS

| CN | 110944748 A | 3/2020 |
| EP | 0302672 A2 | 2/1989 |
| WO | 2018115601 A1 | 6/2018 |
| WO | 2019001754 A1 | 1/2019 |

OTHER PUBLICATIONS

Chemical Abstracts Service, Columbus, Ohio, US; Oct. 15, 2004, Priya, S., "Mononuclear and heterodinuclear transition metal complexes of functionalized phosphines", XP002804405, retrieved from STN Database accession No. 2004: 792135; abstract and pp. 3335-3349.

Ibanez, Susana et al., "A Ferrocenyl-Benzo-Fused Imidazolylidene Complex of Ruthenium as Redox-Switchable Catalyst for the Transfer Hydrogenation of Ketones and Imines", CHEMCATCHEM, vol. 8, No. 24, Dec. 1, 2016, pp. 3790-3795.

Zhang, Yu et al., "Application of Hemilabile Ligands to "At-Metal Switching" Hydrogenation Catalysis", Organometallics, vol. 39, No. 19, Oct. 12, 2020, pp. 3602-3612.

Lorkovic, Ivan M., et al., "Use of the Redox-Active Lignd 1, 1'-Bis(diphenylphosphino)cobaltocene To Reversibly Alter the Rate of the Rhodium(I)-Catalyzed Reduction and Isomerization of Ketones and Alkenes", Journal of American Chemical Society, 1995, vol. 117, pp. 3617-3618.

Kue, Mei et al., "Effect of triarylphosphane ligands on the rhodium-catalyzed hydrosilylation of alkene", Applied Organometallic Chemistry 2014, vol. 28, pp. 120-126.

Chen Yuan-mon et al., "Synthesis of phosphine platinum and phosphine rhodium complexes supported by organosilicon polymers and hydrogenation properties of catalysts", Journal of Applied Chemistry, No. 3, 1989, p. 1-5.

CATALYST, REDOX-SWITCHABLE CATALYST SYSTEM, AND RELATED METHODS INVOLVING HYDROSILYLATION

CROSS-REFERENCE TO RELATED APPLICATIONS

This application is the U.S. National Stage of International Application No. PCT/US2021/040457 filed on 6 Jul. 2021, which claims priority to and all advantages of U.S. Provisional Patent Application No. 63/048,613 filed on 6 Jul. 2020, the content of which is incorporated herein by reference.

FIELD OF THE INVENTION

The present invention generally relates to a catalyst and, more specifically, to a catalyst for hydrosilylation and to a redox-switchable catalyst system for preparing the catalyst. The present invention also relates to compositions including the same and related methods.

BACKGROUND

Hydrosilylation reactions are generally known in the art and involve an addition reaction between silicon-bonded hydrogen and aliphatic unsaturation. Hydrosilylation reactions are utilized in various applications. For example, curable compositions often rely on hydrosilylation reactions for purposes of curing or crosslinking components thereof to give a cured product.

Hydrosilylation reactions may also be utilized to prepare individual components or compounds, e.g. components for inclusion in curable compositions.

Hydrosilylation reactions are carried out in the presence of a catalyst, which is typically a platinum metal due to its excellent catalytic activity. Metal complexes can also be utilized to catalyze hydrosilylation reactions. However, it is difficult to control catalytic activity of the catalyst, which influences when the hydrosilylation reaction is initiated.

BRIEF SUMMARY

The present invention provides a catalyst for hydrosilylation. The catalyst comprises a complex having the following formula:

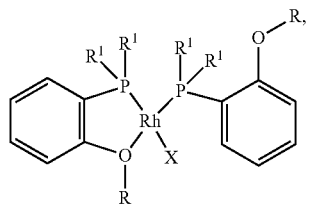

wherein each R is an independently selected hydrocarbyl group, each $R^1$ is an independently selected aryl group, and X is a halogen atom.

The present invention also provides a redox-switchable catalyst system for preparing the catalyst. The redox-switchable catalyst system comprises a redox-switchable catalyst comprising a complex having the following formula:

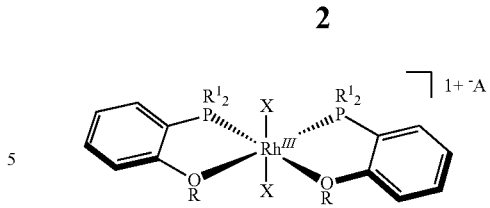

wherein each R is independently selected and defined above, each $R^1$ is independently selected and defined above, each X is independently a halogen atom, and A is a counter anion. The redox-switchable catalyst system further comprises a reducing compound. In addition, the present invention provides a method of preparing the catalyst with the redox-switchable catalyst system.

The method comprises reducing the redox-switchable catalyst with the reducing compound to give the catalyst.

The present invention further provides a method of preparing the catalyst. The method comprises complexing starting material (I) of formula $[RhR^2{}_2X]_2$ and starting material (II) of formula

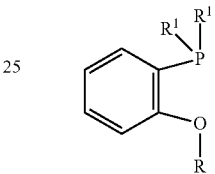

to give the catalyst. In starting material (I), each $R^2$ is an independently selected aliphatically unsaturated group and each X is an independently selected halogen atom. In starting material (II), R is a hydrocarbyl group, and each $R^1$ is an independently selected aryl group.

Further, the present invention provides a composition. The composition comprises (A) an unsaturated compound including at least one aliphatically unsaturated group per molecule, subject to at least one of the following two provisos: (1) the (A) unsaturated compound also includes at least one silicon-bonded hydrogen atom per molecule; and/or (2) the composition further comprises (B) a silicon hydride compound including at least one silicon-bonded hydrogen atom per molecule. The composition further comprises the catalyst and/or the redox-switchable catalyst system.

A method of preparing a hydrosilylation reaction product is also provided. The method comprises reacting an aliphatically unsaturated group and a silicon-bonded hydrogen atom in the presence of the catalyst to give the hydrosilylation reaction product. The aliphatically unsaturated group is present in the (A) unsaturated compound, which is subject to the same provisos noted above in regards to the composition. The catalyst may be formed in situ in the method from the redox-switchable catalyst system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
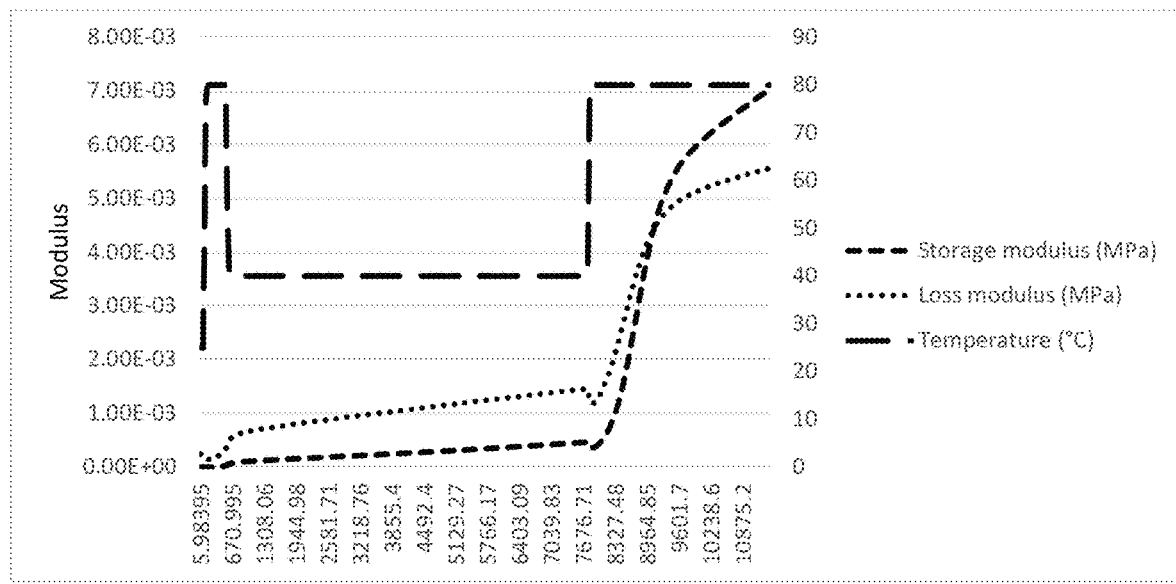
FIG. 1 shows storage modulus, loss modulus, and temperature as a function of time in connection with the curing process as monitored in real time by rheometer for Example 6.

The present invention provides a catalyst. The catalyst has excellent physical properties and catalytic activity in hydrosilylation reactions. The catalyst can be formed in situ from a redox-switchable catalyst system, thereby allowing for hydrosilylation to be selectively controlled or initiated based on such redox-switching (i.e., turned "on" via a formal change in oxidation state).

The catalyst has the following structure:

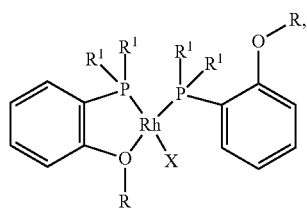

wherein each R is an independently selected hydrocarbyl group, each $R^1$ is an independently selected aryl group, and X is a halogen atom.

The halogen atom represented by X can be fluorine (F), chlorine (Cl), bromine (Br), iodine (I), astatine (At), or tennessine (Ts). In certain embodiments, X is Br or Cl. In specific embodiments, X is Cl.

Each R is independently selected and may be linear, branched, cyclic, or combinations thereof. Cyclic hydrocarbyl groups encompass aryl groups as well as saturated or non-conjugated cyclic groups. Cyclic hydrocarbyl groups may be monocyclic or polycyclic. Linear and branched hydrocarbyl groups may independently be saturated or unsaturated. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of R may be replaced with an atom other than carbon, i.e., R may include one or more heteroatoms within the chain, such as oxygen, sulfur, nitrogen, etc. Typically, each R is free from heteroatoms. Suitable alkyl groups are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups are exemplified by, but not limited to, phenyl, tolyl, xylyl, naphthyl, benzyl, and dimethyl phenyl. Suitable alkenyl groups include vinyl, allyl, propenyl, isopropenyl, butenyl, isobutenyl, pentenyl, heptenyl, hexenyl, and cyclohexenyl groups. Suitable monovalent halogenated hydrocarbon groups include, but are not limited to, a halogenated alkyl group of 1 to 6 carbon atoms, or a halogenated aryl group of 6 to 10 carbon atoms. Suitable halogenated alkyl groups are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups are exemplified by, but not limited to, the aryl groups described above where one or more hydrogen atoms is replaced with a halogen atom, such as F or Cl. For example, chlorobenzyl and fluorobenzyl are suitable halogenated aryl groups.

In specific embodiments, each R is an independently selected alkyl group, which may be linear, branched, cyclic (e.g. cycloalkyl), or combinations thereof. In certain embodiments, each R is linear or branched. In specific embodiments, each R is linear.

Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, and octadecyl, as well as branched saturated hydrocarbon groups having from 6 to 8 carbon atoms. Examples of suitable non-conjugated cyclic groups (i.e., cycloalkyl groups) include cyclobutyl, cyclohexyl, and cycloheptyl groups.

In certain embodiments, each R independently has from 1 to 8, alternatively from 1 to 7, alternatively from 1 to 6, alternatively from 1 to 5, alternatively from 1 to 4, alternatively from 1 to 3, alternatively from 1 to 2, alternatively 1, carbon atoms.

Each $R^1$ may also be an independently selected hydrocarbyl group. However, typically, each $R^1$ is an independently selected aryl group. Aryl groups have at least 5 carbon atoms. Aryl groups may be monocyclic or polycyclic. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms. Aryl is exemplified by, but not limited to, phenyl and naphthyl. In certain embodiments, each $R^1$ is a monocyclic aryl group. In specific embodiments, each $R^1$ is a phenyl group.

In certain embodiments, each R and each $R^1$ is independently selected based on a factor such as steric hindrance, electronics (e.g. electron donative, inductive, or withdrawing effects), and the like, or combinations thereof. R and $R^1$ and may be selected to impart symmetry to the catalyst. In these or other embodiments, R and $R^1$ may be independently selected to enforce reactive regioselectivity.

An exemplary embodiment of the catalyst is below, where each R is methyl, each $R^1$ is phenyl, and X is Cl:

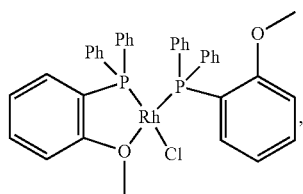

where Ph indicates phenyl.

The catalyst may be in or on a solid carrier. Examples of carriers include activated carbons, silicas, silica aluminas, aluminas, zeolites and other inorganic powders/particles (e.g. sodium sulphate), and the like.

The catalyst may also be disposed in a vehicle, e.g. a solvent which solubilizes the catalyst, alternatively a vehicle which merely carries or disperses, but does not solubilize, the catalyst. Such vehicles are known in the art.

Suitable vehicles include silicones, both linear and cyclic, organic oils, organic solvents and mixtures of these. For example, relative to silicones, the carrier vehicle may comprise a polydialkylsiloxane, e.g. polydimethylsiloxane.

The vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Alternatively, the vehicle may comprise an organic solvent. Examples of organic solvents include: aromatic hydrocarbons, such as benzene, toluene, xylene, mesitylene, etc.; aliphatic hydrocarbons, such as heptane, hexane, octane, etc.; glycol ethers, such as propylene glycol methyl ether, dipropylene glycol methyl ether, propylene glycol n-butyl ether, propylene glycol n-propyl ether, ethylene glycol n-butyl ether, etc.; halogenated hydrocarbons, such as dichloromethane, 1,1,1-trichloroethane, and chloroform; ketones, such as acetone, methylethyl ketone, or methyl isobutyl ketone; acetates, such as ethyl acetate, butyl acetate, ethylene glycol monoethyl ether acetate, and propylene glycol methyl ether acetate; alcohols, such as methanol, ethanol, isopropanol, butanol, or n-propanol; and others organic compounds that present as liquid/fluid at typical reaction temperatures, such as dimethyl sulfoxide, dimethyl formamide, acetonitrile, tetrahydrofuran, white spirits, mineral spirits, naphtha, n-methylpyrrolidone; and the like, as well as derivatives, modifications, and combination thereof.

The catalyst may also be in crystalized form, e.g. grown from a supersaturated solution in the vehicle. However, the catalyst is typically homogenous and not heterogeneous so as to maximize contact interaction with components of and catalysis in hydrosilylation reactions.

The present invention further provides a method of preparing the catalyst. The method comprises complexing starting material (I) of formula $[RhR^2{}_2X]_2$ and starting material (II) of formula

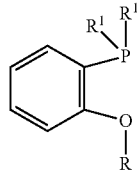

to give the catalyst. In starting material (I), each $R^2$ is an independently selected aliphatically unsaturated group and X is an independently selected halogen atom. In starting material (II), R is a hydrocarbyl group, and each $R^1$ is an independently selected aryl group.

In this method of preparing the catalyst, the catalyst is directly prepared. However, as described in greater detail below, the catalyst can also be prepared from a redox-switchable catalyst system. Use of the catalyst as prepared directly or via the redox-switchable catalyst system is a function of the desired end use application associated with hydrosilylation. For example, use of the catalyst as prepared directly can replace any conventional hydrosilylation-catalyst, typically based on platinum. However, when the catalyst is prepared from the redox-switchable catalyst system, the catalyst can be formed in situ, e.g. in the presence of reactants of a hydrosilylation-curable composition. This allows for selectively controlling when to initiate hydrosilylation rather than initiation upon combination of the reactants, as described in greater detail below.

Starting material (I) has formula $[RhR^2{}_2X]_2$. Each X is independently selected and suitable examples are described above with reference to the catalyst. Typically, each X is Br or Cl, alternatively Cl. Each $R^2$ is an independently selected aliphatically unsaturated group, which is typically an alkenyl and/or alkynyl group having from 2 to 12, alternatively from 2 to 11, alternatively from 2 to 10, alternatively from 2 to 9, alternatively from 2 to 8, alternatively from 2 to 7, alternatively from 2 to 6, alternatively from 2 to 5, alternatively from 2 to 4, alternatively from 2 to 3, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2$=CH, $CH_2$=CHCH$_2$—, $CH_2$=CH(CH$_2$)$_4$—, $CH_2$=CH(CH$_2$)$_6$—, $CH_2$=C(CH$_3$)CH$_2$—, $H_2C$=C(CH$_3$)—, $H_2C$=C(CH$_3$)—, $H_2C$=C(CH$_3$)CH$_2$—, $H_2C$=CHCH$_2$CH$_2$—, $H_2C$=CHCH$_2$CH$_2$CH$_2$—, HC≡C—, HC≡CCH$_2$—, HC≡CCH(CH$_3$)—, HC≡CC(CH$_3$)$_2$—, and HC≡CC(CH$_3$)$_2$CH$_2$—. Typically, aliphatic unsaturation is terminal in $R^2$. As understood in the art, aliphatic unsaturation may be referred to as ethylerfic unsaturation. In specific embodiments, each $R^2$ is vinyl.

A specific example of starting material (I) is chlorobis(ethylene)rhodium dimer, which has formula $Rh_2Cl_2(C_2H_4)_4$, alternatively written as $[Rh(C_2H_4)_2Cl]_2$. This starting material (I) includes two bridging chloride ligands and four ethylene ligands and has the following structure:

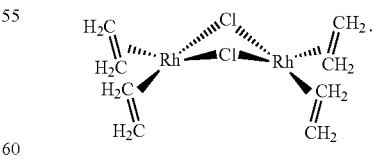

Starting material (II) complexes with starting material (I) as a ligand via displacement of $R^2$ in starting material (I).

Specific examples of R and $R^1$ of starting material (II) are defined above with reference to the catalyst, as R and $R^1$ of starting material (II) become R and $R^1$ of the catalyst upon formation of the ligand.

An exemplary example of starting material (II) is 2-(diphenylphosphino)anisole, which has the structure:

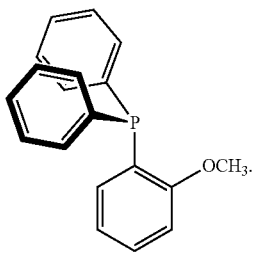

Typically, the catalyst is formed from a molar ratio of 4:1 of starting material (II) to starting material (I). However, a molar or stoichiometric excess starting material (I) or starting material (II) may be utilized relative to the other. The reaction to complex starting material (II) with starting material (I) may be carried out in a carrier, examples of which are described above. The reaction can be carried out at ambient conditions, but may be carried out in an inert atmosphere (e.g. nitrogen), optionally while controlling or modifying temperature, humidity, pressure, etc. from ambient conditions.

As introduced above, also provided is a redox-switchable catalyst system for preparing the catalyst. The redox-switchable catalyst system comprises a redox-switchable catalyst comprising a complex having the following formula:

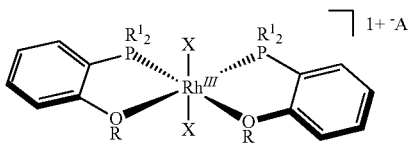

wherein each R is independently selected and defined above, each $R^1$ is independently selected and defined above, each X independently selected and defined above, and A is a counter anion.

In certain embodiments, the counter anion A has formula $(BQ_4)^-$, where B is boron in a formal oxidation state of 3; and each Q is independently selected from a hydrocarbyl group, a hydrocarbyloxy group, a fluorinated hydrocarbyl group, a fluorinated hydrocarbyloxy group, or a fluorinated silylhydrocarbyl group, with the proviso that no more than one Q is hydrocarbyl. Most typically, each Q is selected from a fluorinated aryl group, for example a pentafluorophenyl or nonafluorobiphenyl group. Specific examples of such counter anions include tetrakis[3,5-bis(trifluoromethyl)phenyl]borate, tetrakis[pentafluorophenyl]borate, and tetrakis(nonafluorobiphenyl)borate. Alternatively, the counter anion A can comprise hexafluorophosphate, tetrafluoroborate, and/or an aluminum perfluoroalkoxides. Further still, the counter anion A can comprise a halide.

Generally, unlike the catalyst described above, the redox-switchable catalyst of the redox-switchable catalyst system is not active in catalyzing hydrosilylation. However, the redox-switchable catalyst can be converted to the catalyst, which is catalytically active for hydrosilylation, via reduction with a reducing compound.

The redox-switchable catalyst system further comprises such a reducing compound. In certain embodiments, the reducing compound serves to reduce the formal oxidation state of the rhodium atom in the redox-switchable catalyst, resulting in the catalyst described above. Examples of reducing compounds include an alkali metal amalgam; hydrogen; a metal hydride, such as lithium aluminum hydride ($LiAlH_4$), diisobutylaluminium hydride, or sodium naphthalenide; a silyl hydride; or a metal borohydride such as sodium triethylborohydride ($NaEt_3BH$), lithium triethylborohydride ($LiEt_3BH$), or sodium borohydride ($NaBH_4$). In certain embodiments, the reducing compound is i) a borohydride compound; (ii) an aluminum hydride compound; (iii) an organolithium compound; (iv) an organomagnesium compound; or (v) any combination of (i) to (iv). In specific embodiments, the reducing compound comprises bis(cyclopentadienyl)cobalt(II), or cobaltocene. Additional examples of suitable reducing compounds include Zinc dust or particles, trichlorotris(tetrahydrofuran)titanium(III), and/or hydrazine. Another specific example of a reducing compound is tetrakis(dimethylamino)ethylene (TDAE).

In addition, the present invention provides a method of preparing the catalyst with the redox-switchable catalyst. The method comprises reducing the redox-switchable catalyst with the reducing compound. The redox-switchable catalyst and reducing compound are described above.

The method allows for selectively controlling initiation of hydrosilylation in a hydrosilylation-curable composition. For example, when forming a conventional hydrosilylation-curable composition including a conventional hydrosilylation catalyst, hydrosilylation is typically initiated, even if only partially at ambient conditions. However, because the redox-switchable catalyst is typically inactive in catalyzing hydrosilylation, the redox-switchable catalyst may be disposed in a hydrosilylation-curable composition without initiating hydrosilylation or at particularly low conversion so as to prevent gelling. The redox-switchable catalyst can be reduced via the reducing compound at any desired time by combining the hydrosilylation-curable composition including the redox-switchable catalyst with the reducing compound, at which point the redox-switchable catalyst converts to the catalyst and becomes catalytically active (as to hydrosilylation) via a formal change in its oxidation state. The redox-switchable catalyst can be reduced with the reducing compound to give the catalyst prior to incorporating the catalyst into a hydrosilylation curable composition, or may be reduced in situ such that the catalyst is formed in situ.

The relative amounts of the catalyst and the reducing compound may vary in both the redox-switchable catalyst system and related method of reducing the redox-switchable catalyst depending, for example, on the selection of the catalyst, the reducing compound, the ligands, etc. One of skill in the art readily understands how to determine proper molar ratios in view of these selections.

The redox-switchable catalyst system typically forms a reaction product upon the reducing compound reductively converting the redox-switchable catalyst to the catalyst. A catalytic reaction product formed from the redox-switchable catalyst system is also provided. The catalytic reaction product is typically utilized when catalyzing hydrosilylation, which may be formed prior to or contemporaneous with catalyzing the reaction (e.g. the catalytic reaction product is formed in situ), as described above. The catalytic reaction product includes the catalyst.

As introduced above, the present invention also provides a composition. The composition comprises (A) an unsaturated compound. The (A) unsaturated compound includes at least one aliphatically unsaturated group per molecule, which may alternatively be referred to as ethylenic unsaturation. The (A) unsaturated compound is not limited and may be any unsaturated compound having at least one aliphatically unsaturated group. In certain embodiments, the (A) unsaturated compound comprises an organic compound. In other embodiments, the (A) unsaturated compound comprises a siloxane. In yet other embodiments, the (A) unsaturated compound comprises a silicone-organic hybrid, or an organosilicon compound. Various embodiments and examples of the (A) unsaturated compound are disclosed below.

In certain embodiments, the (A) unsaturated compound includes an average of at least two aliphatically unsaturated groups per molecule. In such embodiments, the (A) unsaturated compound is capable of polymerization or curing beyond single cure-site hydrosilylation. The aliphatically unsaturated groups of the (A) unsaturated compound may be terminal, pendent, or in both locations in the (A) unsaturated compound.

For example, the aliphatically unsaturated group may be an alkenyl group and/or an alkynyl group. "Alkenyl group" means an acyclic, branched or unbranched, monovalent hydrocarbon group having one or more carbon-carbon double bonds. The alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkenyl groups are exemplified by, but not limited to, vinyl, allyl, propenyl, and hexenyl. "Alkynyl group" means an acyclic, branched or unbranched, monovalent hydrocarbon group having one or more carbon-carbon triple bonds. The alkynyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkynyl is exemplified by, but not limited to, ethynyl, propynyl, and butynyl.

In specific embodiments, the (A) unsaturated compound has the formula $R^2$—Z—$R^2$, where Z is a divalent linking group, which may be a divalent hydrocarbon, a polyoxyalkylene, a polyalkylene, a polyisoalkylene, a hydrocarbon-silicone copolymer, a siloxane, or mixtures (in block or randomized form) thereof. Z may be linear or branched. In these specific embodiments, $R^2$ is independently selected and includes aliphatic unsaturation, i.e., each $R^2$ is independently selected from alkenyl groups and alkynyl groups.

In these specific embodiments, the (A) unsaturated compound includes two aliphatically unsaturated groups represented by $R^2$.

In one embodiment of the (A) unsaturated compound, Z is a divalent hydrocarbon. The divalent hydrocarbon Z may contain 1 to 30 carbons, either as aliphatic or aromatic structures, and may be branched or unbranched. Alternatively, the linking group Z may be an alkylene group containing 1 to 12 carbons. In these embodiments, the (A) unsaturated compound may be selected from α, ω-unsaturated hydrocarbons. The α, ω-unsaturated hydrocarbons may alternatively be referred to as olefins.

For example, the (A) unsaturated compound may be any diene, diyne or ene-yne compound. With reference to the formula above, in these embodiments, $R^2$ may be, for example, independently selected from $CH_2$=CH—, $CH_2$=CHCH$_2$—, $CH_2$=CH(CH$_2$)$_4$—, $CH_2$=C(CH$_3$)CH$_2$— or and similar substituted unsaturated groups such as $H_2C$=C(CH$_3$)—, and HC=C(CH$_3$)—. In such embodiments, the (A) unsaturated compound may be referred to as an α,ω-unsaturated hydrocarbon. The α,ω-unsaturated hydrocarbon may be, for example, an α,ω-diene of the formula $CH_2$=CH(CH$_2$)$_b$CH=CH$_2$, an α,ω-diyne of the formula CH≡C(CH$_2$)$_b$C≡CH, an α,ω-ene-yne of the formula $CH_2$=CH(CH$_2$)$_b$C≡CH, or mixtures thereof, where b is independently from 0 to 20, alternatively from 1 to 20.

Specific examples of suitable diene, diyne or ene-yne compounds include 1,4-pentadiene, 1,5-hexadiene; 1,6-heptadiene; 1,7-octadiene, 1,8-nonadiene, 1,9-decadiene, 1,11-dodecadiene, 1,13-tetradecadiene, and 1,19-eicosadiene, 1,3-butadiyne, 1,5-hexadiyne (dipropargyl), and 1-hexene-5-yne.

However, the (A) unsaturated compound may alternatively have the formula $R^2$—Z', where $R^2$ is defined above and Z' is a monovalent hydrocarbon group (or silyl or siloxane group). In these specific embodiments, the (A) unsaturated compound includes one aliphatically unsaturated group represented by $R^2$.

When the (A) unsaturated compound includes only one aliphatically unsaturated group, the (A) unsaturated compound may be referred to as an unsaturated hydrocarbon, and may be any -ene or -yne compound. In such embodiments, the (A) unsaturated compound may be an acyclic alkene and/or an acyclic alkyne. However, the (A) unsaturated compound may include aryl groups so long as the (A) unsaturated compound also includes the at least one aliphatically unsaturated group independent from any aryl groups, e.g. pendent therefrom.

In another embodiment, the (A) unsaturated compound comprises, alternatively is, a polyether. In these embodiments, the (A) unsaturated compound comprises a polyoxyalkylene group having the formula $(C_aH_{2a}O)$, wherein a is from 2 to 4 inclusive. With reference to the general formula above, Z' is the polyoxyalkylene group. In these embodiments, the (A) unsaturated compound may be referred to as the polyoxyalkylene.

The polyoxyalkylene may comprise oxyethylene units $(C_2H_4O)$, oxypropylene units $(C_3H_6O)$, oxybutylene or oxytetramethylene units $(C_4H_8O)$, or mixtures thereof, which may be in block form or randomized in the (A) unsaturated compound.

For example, the (A) unsaturated compound as the polyoxyalkylene may have the following general formula:

$$R^2O-[(C_2H_4O)_c(C_3H_6O)_d(C_4H_8O)_e]-R^2$$

wherein each $R^2$ is independently selected and defined above; c is from 0 to 200, d is from 0 to 200, and e is from 0 to 200, with the proviso that c, d and e are not simultaneously 0. In specific embodiments, c is from 0 to 50, alternatively from 0 to 10, alternatively from 0 to 2. In these or other embodiments, d is from 0 to 100, alternatively 1 to 100, alternatively 5 to 50. In these or other embodiments, e is from 0 to 100, alternatively 0 to 50, alternatively 0 to 30. In various embodiments, the ratio of (d+e)/(c+d+e) is greater than 0.5, alternatively greater than 0.8, or alternatively greater than 0.95.

This polyoxyalkylene is terminated at each molecular chain end (i.e. alpha and omega positions) with $R^2$, which is independently selected and described above. Additional examples of $R^2$ include $H_2C$=C(CH$_3$)CH$_2$— 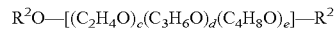 $H_2C$=CHCH$_2$CH$_2$—, $H_2C$=CHCH$_2$CH$_2$CH$_2$—, and $H_2C$=CHCH$_2$CH$_2$CH$_2$CH$_2$—, HC≡C—, HC≡CCH$_2$—, HC≡CCH(CH$_3$)—, HC≡CC(CH$_3$)$_2$—, HC≡CC(CH$_3$)$_2$CH$_2$—. However, the polyoxyalkylene set forth above is merely one exemplary example of a suitable polyoxyalkylene.

In specific embodiments, the polyoxyalkylene group comprises only oxypropylene units $(C_3H_6O)$. Representative, non-limiting examples of polyoxypropylene-containing polyoxyalkylenes include: H$_2$C=CHCH$_2$[C$_3$H$_6$O]$_d$CH$_2$CH=CH$_2$, H$_2$C=CH[C$_3$H$_6$O]$_d$CH=CH$_2$, H$_2$C=C(CH$_3$)CH$_2$[C$_3$H$_6$O]$_d$CH$_2$C(CH$_3$)=CH$_2$, HC≡CCH$_2$[C$_3$H$_6$O]$_d$CH$_2$C≡CH, and HC≡CC(CH$_3$)$_2$[C$_3$H$_6$O]$_d$C(CH$_3$)$_2$C≡CH, where d is as defined above.

Representative, non-limiting examples of polyoxybutylene or poly(oxytetramethylene) containing polyoxyalkylenes include: H$_2$C=CHCH$_2$[C$_4$H$_8$O]$_e$CH$_2$CH=CH$_2$, H$_2$C=CH[C$_4$H$_8$O]$_e$CH=CH$_2$, H$_2$C=C(CH$_3$)CH$_2$[C$_4$H$_8$O]$_e$CH$_2$C(CH$_3$)=CH$_2$, HC≡CCH$_2$[C$_4$H$_8$O]$_e$CH2C≡CH, and HC≡CC(CH$_3$)$_2$[C$_4$H$_8$O]$_e$C(CH$_3$)$_2$C≡CH, where e is as defined above.

The examples of polyoxyalkylenes suitable for (A) the unsaturated compound include two aliphatically unsaturated groups. However, the polyoxyalkylene suitable for (A) the unsaturated compound may include only one aliphatically unsaturated group. For example, the polyoxyalkylene suitable for (A) the unsaturated compound may alternatively have the following general formula:

$$R^2O\text{—}[(C_2H_4O)_c(C_3H_6O)_d(C_4H_8O)_e]\text{—}R^3$$

where R$^2$, c, d, and e are defined above, and R$^3$ is H or an alkyl group, such as CH$_3$. Any description or examples above also apply to this embodiment as well. One of skill in the art readily understands how the examples of polyoxyalkylenes above with two aliphatically unsaturated groups may alternatively include but one aliphatically unsaturated group.

The polyoxyalkylene may be prepared by, for example, the polymerization of ethylene oxide, propylene oxide, butylene oxide, 1,2-epoxyhexane, 1,2-epoxyoctane, and/or cyclic epoxides, such as cyclohexene oxide or exo-2,3-epoxynorborane. The polyoxyalkylene moiety of the polyoxyalkylene may comprise oxyethylene units (C$_2$H$_4$O), oxypropylene units (C$_3$H$_6$O), oxybutylene units (C$_4$H$_8$O), or mixtures thereof. Typically, the polyoxyalkylene group comprises a majority of oxypropylene or oxybutylene units, as defined on a molar basis and indicated in the above formula by the c, d, and e subscripts.

In another embodiment, Z of the general formula R$^2$—Z—R$^2$ or Z' or the formula R$^2$—Z' of the (A) unsaturated compound comprises a polyalkylene group. The polyalkylene group may comprise from C$_2$ to C$_6$ alkylene units or their isomers. One specific example is polyisobutylene group, which is a polymer including isobutylene units. For example, the (A) unsaturated compound may be a di-allyl terminated polyisobutylene or an allyl-terminated polyisobutylene. The molecular weight of the polyisobutylene group may vary, but typically ranges from 100 to 10,000 g/mole.

In certain embodiments, the (A) unsaturated compound comprises an organopolysiloxane. The organopolysiloxane is not limited and may be any organopolysiloxane including at least one silicon-bonded aliphatically unsaturated group per molecule. For example, the organopolysiloxane may be linear, branched, partly branched, cyclic, resinous (i.e., have a three-dimensional network), or may comprise a combination of different structures. When the (A) unsaturated compound comprises the organopolysiloxane, the aliphatically unsaturated group is silicon-bonded (e.g. as silicon-bonded alkenyl and/or silicon-bonded alkynyl).

In certain embodiments when the (A) unsaturated compound comprises an organopolysiloxane, the organopolysiloxane has the following average formula:

$$R^4_f SiO_{(4-f)/2}$$

wherein each R$^4$ is an independently selected substituted or unsubstituted hydrocarbyl group with the proviso that in each molecule, at least one, alternatively at least two, R$^4$ groups is an aliphatically unsaturated group, and wherein f is selected such that 0<f≤3.2.

The average formula above for the organopolysiloxane may be alternatively written as $(R^4_3SiO_{1/2})_w(R^4_2SiO_{2/2})_x(R^4SiO_{3/2})_y(SiO_{4/2})_z$, where R$^4$ and its proviso is defined above, and w, x, y, and z are independently from ≥0 to ≤1, with the proviso that w+x+y+z=1. One of skill in the art understands how such M, D, T, and Q units and their molar fractions influence subscript f in the average formula above. T and Q units, indicated by subscripts y and z, are typically present in silicone resins, whereas D units, indicated by subscript x, are typically present in silicone polymers (and may also be present in silicone resins).

Each R$^4$ is independently selected, as introduced above, and may be linear, branched, cyclic, or combinations thereof. In general, hydrocarbyl groups suitable for R$^4$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In certain embodiments, the organopolysiloxane is substantially linear, alternatively is linear. In these embodiments, the substantially linear organopolysiloxane may have the average formula:

$$R^4_f SiO_{(4-f)/2}$$

wherein each $R^4$ and its proviso are defined above, and wherein f' is selected such that $1.9 \leq f' \leq 2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

$$(R^4{}_3SiO_{1/2})_{m'}(R^4{}_2SiO_{2/2})_{n'}(R^4SiO_{3/2})_{o},$$

wherein each $R^4$ is independently selected and defined above (including the proviso that in each molecule, at least one $R^4$ is an aliphatically unsaturated group), and $m' \geq 2$, $n' \geq 0$, and $o \geq 2$. In specific embodiments, m' is from 2 to 10, alternatively from 2 to 8, alternatively from 2 to 6. In these or other embodiments, n' is from 0 to 1,000, alternatively from 1 to 500, alternatively from 1 to 200. In these or other embodiments, o is from 2 to 500, alternatively from 2 to 200, alternatively from 2 to 100.

When the organopolysiloxane is substantially linear, alternatively is linear, the silicon-bonded aliphatically unsaturated group(s) may be pendent, terminal or in both pendent and terminal locations. As a specific example of the organopolysiloxane having pendent silicon-bonded aliphatically unsaturated groups, the organopolysiloxane may have the average formula:

$$(CH_3)_3SiO[(CH_3)_2SiO]_{n'}[(CH_3)ViSiO]_{m'}Si(CH_3)_3$$

where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

$$Vi(CH_3)_2SiO[(CH_3)_2SiO]_{n'}Si(CH_3)_2Vi$$

where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, the (A) organopolysiloxane may have the average formula:

$$Vi(CH_3)_2SiO[(CH_3)_2SiO]_{n'}[(CH_3)ViSiO]_{m'}SiVi(CH_3)_2$$

where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, the (A) organopolysiloxane may be a resinous organopolysiloxane. In these embodiments, the resinous organopolysiloxane may have the average formula:

$$R^4{}_{f''}SiO_{(4-f'')/2}$$

wherein each $R^4$ and its provisos are defined above, and wherein f'' is selected such that $0.5 \leq f'' \leq 1.7$.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). The resinous organopolysiloxane comprises T and/or Q units. A specific example of the resinous organopolysiloxane is a vinyl functional silsesquioxane, or a vinyl functional MQ resin.

The organopolysiloxane may comprise a combination or mixture of different organopolysiloxanes, including those of different structures.

Alternatively, the (A) unsaturated compound may be a silicone-organic hybrid. For example, the (A) unsaturated compound may comprise the hydrosilylation reaction product of organopolysiloxanes (or of one or more organopolysiloxanes with one or more organic compounds), in which case the backbone of the (A) unsaturated compound may include organic divalent linking groups. As another example, organohydrogensiloxanes may be reacted with other organopolysiloxanes, or with organic compounds, to give the (A) unsaturated compound.

For example, the (A) unsaturated compound may be the reaction product of (a1) at least one Si—H compound and (b1) at least one compound having ethylenic unsaturation. In these embodiments, a molar excess of ethylenic unsaturated groups of the (b1) compound are utilized as compared to Si—H groups of the (a1) Si—H compound such that the (A) unsaturated compound includes at least one, alternatively an average of at least two, silicon-bonded aliphatically unsaturated groups.

The reaction product of the (a1) Si—H compound and the (b1) compound having ethylenic unsaturation may be referred to as an (AB)n type copolymer, with the (a1) Si—H compound forming units A and the (b1) compound having ethylenic unsaturation forming units B. Combinations of different (a1) Si—H compounds may be utilized, and combinations of different (b1) compounds having ethylenic unsaturation may be utilized, such that the resulting (b) crosslinking agent comprises distinct units but may not be an (AB)n type copolymer. The distinct units may be randomized or in block form.

Alternatively still, the (A) unsaturated compound may comprise an organosilicon-compound, but not an organopolysiloxane. For example, the (A) unsaturated compound may comprise a silane, a disilane, or a siloxane (for example a disiloxane), while not constituting an organopolysiloxane.

One example of a suitable silane is that of formula $R^5_{z''}SiR^6_{4-z''}$, where each $R^5$ independently is an aliphatically unsaturated group, $R^6$ is independently a substituted or unsubstituted hydrocarbyl group, and $1 \leq z'' \leq 4$. One example of a siloxane is tetramethyldivinyldisiloxane. One of skill in the art understands how to prepare or obtain such compounds for use as the (A) unsaturated compound.

The (A) unsaturated compound can be a single unsaturated compound or a combination comprising two or more different silicon hydride compounds.

The composition and (A) unsaturated compound are subject to at least one of the following two provisos: (1) the (A) unsaturated compound also includes at least one silicon-bonded hydrogen atom per molecule; and/or (2) the composition further comprises (B) a silicon hydride compound including at least one silicon-bonded hydrogen atom per molecule.

In a first embodiment, the proviso (1) is true such that the (A) unsaturated compound also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the (A) unsaturated compound also includes at least one silicon-bonded hydrogen atom per molecule, and that the composition further comprises (B) a silicon hydride compound including at least one silicon-bonded hydrogen atom per molecule.

In the first embodiment, the proviso (1) is true and the (A) unsaturated compound includes at least one silicon-bonded hydrogen atom per molecule in addition to the aliphatically unsaturated group. In these embodiments, the (A) unsaturated compound may be any compound including at least one silicon-bonded hydrogen atom and at least one aliphatically unsaturated group. In these embodiments, the (A) unsaturated compound is typically an organosilicon compound and/or an organopolysiloxane.

One of skill in the art readily understands how to prepare or obtain such unsaturated compounds. For example, organosilicon compounds including both aliphatic unsaturated and silicon-bonded hydrogen may be prepared from the unsaturated organic compounds disclosed above. As but one example, an α,ω-diene of the formula $CH_2=CH(CH_2)_b CH=CH_2$ may be reacted with a silane of formula $H_2Si(CH_3)_2$ in the presence of a hydrosilylation catalyst to give an unsaturated compound of formula $CH_2=CH(CH_2)_b CH_2CH_2Si(CH_3)_2H$, which includes one aliphatically unsaturated group and one silicon-bonded hydrogen atom. The organosilicon compound may also be a silane, disilane, siloxane, etc. For example, the organosilicon compound may be of formula $R^5_{b'}H_{c'}SiR^6_{4-b'c'}$, where $R^5$ and $R^6$ are independently selected and defined above, b' is 1, 2, or 3, c' is 1, 2, or 3, with the proviso that $2 \leq (b'+c') \leq 4$.

When the (A) unsaturated compound comprises the organopolysiloxane having both aliphatic unsaturation and silicon-bonded hydrogen, the organopolysiloxane may have the formula $R^4_{d'}H_{e'}SiO_{(4-d'-e')/2}$, where $R^4$ is independently selected and defined above (still subject to the proviso that at least one $R^4$ is the aliphatically unsaturated group), and e' and f' are each greater than 0 such that $0<(d'+e')\leq 3.2$.

Alternatively, when the (A) unsaturated compound comprises the organopolysiloxane having both aliphatic unsaturation and silicon-bonded hydrogen, the silicon-bonded aliphatically unsaturated group(s) and the silicon-bonded hydrogen atom(s) may be present in any M, D, and/or T siloxy unit present in the organopolysiloxane, and may be bonded to the same silicon atom (in the case of M and/or D siloxy units). The organopolysiloxane may comprise, for example, as M siloxy units: $(R^4_3SiO_{1/2})$, $(R^4_2HSiO_{1/2})$, $(R^4H_2SiO_{1/2})$, and/or $(H_3SiO_{1/2})$. The organopolysiloxane may comprise, for example, as D siloxy units: $(R^4_2SiO_{2/2})$, $(R^4HSiO_{2/2})$, and/or $(H_2SiO_{2/2})$. The organopolysiloxane may comprise, for example, as T siloxy units: $(R^4SiO_{3/2})$ and/or $(HSiO_{3/2})$. Such siloxy units may be combined in any manner, optionally along with Q siloxy units, to give an organopolysiloxane having at least one silicon-bonded aliphatically unsaturated group designated by $R^4$ and at least one silicon-bonded hydrogen atom.

For example, the organopolysiloxane may have any one of the following formulas:

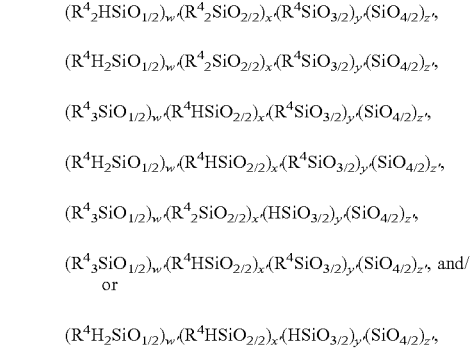

etc., where each $R^4$ is independently selected and defined above (with at least one $R^5$ being an aliphatically unsaturated group), and w', x', y', and z' are independently from $\geq 0$ to $\leq 1$, with the proviso that $w'+x'+y'+z''=1$.

In the second embodiment, the proviso (2) is true and the composition further comprises (B) a silicon hydride compound including at least one silicon-bonded hydrogen atom per molecule. In these embodiments, the (B) silicon hydride compound may be any compound including at least one silicon-bonded hydrogen atom. Depending on a structure of the (B) silicon hydride compound, the (B) silicon hydride compound may be a silane compound, an organosilicon compound, an organohydrogensilane, an organohydrogensiloxane, etc.

The (B) silicon hydride compound can be linear, branched, cyclic, resinous, or have a combination of such structures. In acyclic polysilanes and polysiloxanes, the silicon-bonded hydrogen atom(s) can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, the (B) silicon hydride compound is of formula $R^7_{4-s}SiH_s$, where $R^7$ is independently selected and may be any silicon-bonded group, and s is selected such that $1 \leq s \leq 4$. Typically, s is 1, 2, or 3, alternatively 1 or 2. Each $R^7$ is typically independently a substituted or unsubstituted hydrocarbyl group, suitable examples of which are described above.

However, $R^7$ can be any silicon-bonded group so long as the (B) silicon hydride is still capable of undergoing hydrosilylation via its silicon-bonded hydrogen atom. For example, $R^7$ can be a halogen. When the (B) silicon hydride is a silane compound, the (B) silicon hydride can be a monosilane, disilane, trisilane, or polysilane.

In these or other embodiments, the (B) silicon hydride compound may be an organosilicon compound of formula: $H_gR^8_{3-g}Si—R^9—SiR^8_2H$, wherein each $R^8$ is an independently selected substituted or unsubstituted hydrocarbyl group, g' is 0 or 1, and $R^9$ is a divalent linking group. $R^9$ may be a siloxane chain (including, for example, $—R^8_2SiO—$, $—R^8HSiO—$, and/or $—H_2SiO—$ D siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

When g' is 1, and when $R^9$ is a divalent hydrocarbon group, specific examples of the (B) silicon hydride compound include:

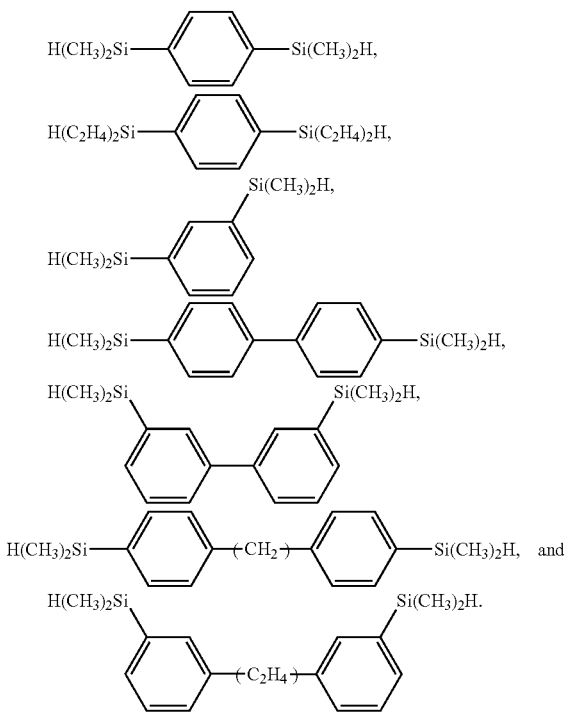

In these or other embodiments, the (B) silicon hydride compound comprises an organohydrogensiloxane, which can be a disiloxane, trisiloxane, or polysiloxane. Examples of organohydrogensiloxanes suitable for use as the (B) silicon hydride compound include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl. Additional examples of organohydrogensiloxanes that are suitable for purposes of the (B) silicon hydride compound include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When the (B) silicon hydride compound comprises an organohydrogensiloxane, the (B) silicon hydride compound may comprise any combination of M, D, T and/or Q siloxy units, so long as the (B) silicon hydride compound includes at least one silicon-bonded hydrogen atom.

These siloxy units can be combined in various manners to form cyclic, linear, branched and/or resinous (three-dimensional networked) structures. The (B) silicon hydride compound may be monomeric, polymeric, oligomeric, linear, branched, cyclic, and/or resinous depending on the selection of M, D, T, and/or Q units.

Because the (B) silicon hydride compound includes at least one silicon-bonded hydrogen atom, with reference to the siloxy units set forth above, the (B) silicon hydride compound may comprise any of the following siloxy units including silicon-bonded hydrogen atoms, optionally in combination with siloxy units which do not include any silicon-bonded hydrogen atoms: $(R^8_2HSiO_{1/2})$, $(R^8H_2SiO_{1/2})$, $(H_3SiO_{1/2})$, $(R^8HSiO_{2/2})$, $(H_2SiO_{2/2})$, and/or $(HSiO_{3/2})$, where $R^8$ is independently selected and defined above.

In specific embodiments, for example when the (B) silicon hydride compound is linear, the (B) silicon hydride compound may have the average formula:

wherein each $R^{10}$ is independently hydrogen or $R^8$, each $R^8$ is independently selected and defined above, and e"≥2, f"≥20, and g"≥2. In specific embodiments, e" is from 2 to 10, alternatively from 2 to 8, alternatively from 2 to 6. In these or other embodiments, f'" is from 0 to 1,000, alternatively from 1 to 500, alternatively from 1 to 200. In these or other embodiments, g" is from 2 to 500, alternatively from 2 to 200, alternatively from 2 to 100.

In one embodiment, the (B) silicon hydride compound is linear and includes one or more pendent silicon-bonded hydrogen atoms. In these embodiments, the (B) silicon hydride compound may be a dimethyl, methyl-hydrogen polysiloxane having the average formula;

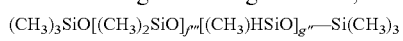

where f'" and g" are defined above.

In these or other embodiments, the (B) silicon hydride compound is linear and includes terminal silicon-bonded hydrogen atoms. In these embodiments, the (B) silicon hydride compound may be an SiH terminal dimethyl polysiloxane having the average formula:

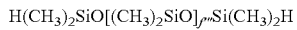

where f'" is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively still, the (B) organohydrogensiloxane may include both pendent and terminal silicon-bonded hydrogen atoms.

In certain embodiments, the (B) silicon hydride compound may have one of the following average formulas:

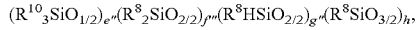

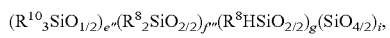

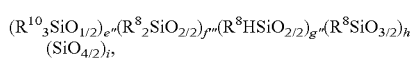

wherein each $R^{11}$ and $R^9$ is independently selected and defined above, e''', f''', and g'' are defined above, and h≥0, and i is ≥0. In each of the average formulas above, the sum of the subscripts is 1.

Some of the average formulas above for the (B) silicon hydride compound are resinous when the (B) silicon hydride compound includes T siloxy units (indicated by subscript h) and/or Q siloxy units (indicated by subscript i). When the (B) silicon hydride compound is resinous, the (B) silicon hydride compound is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which the (B) silicon hydride compound is resinous, or comprises an organopolysiloxane resin, the (B) silicon hydride compound typically has the formula:

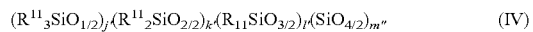

$$(R^{11}{}_3SiO_{1/2})_{j'}(R^{11}{}_2SiO_{2/2})_{k'}(R_{11}SiO_{3/2})_{l'}(SiO_{4/2})_{m''} \quad \text{(IV)}$$

wherein each $R^{11}$ independently is H or a substituted or unsubstituted hydrocarbyl group, with the proviso that in one molecule, at least one $R^{11}$ is H; and wherein 0≤j'≤1; 0≤k'≤1; 0≤l'≤1; and 0≤m''≤1; with the proviso that j'+k'+l'+m''=1.

In certain embodiments, the (B) silicon hydride compound may comprise an alkylhydrogen cyclosiloxane or an alkylhydrogen dialkyl cyclosiloxane copolymer, represented in general by the formula $(R^{11}{}_2SiO)_{r'}(R^{11}HSiO)_{s'}$, where $R^{11}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2 (OSiMeC_6H_{13})_2$, and $(OSiMeH)(OSiMeC_6H_{13})_3$, where Me represents methyl (—$CH_3$).

The (B) silicon hydride compound can be a single silicon hydride compound or a combination comprising two or more different silicon hydride compounds.

Finally, in a third embodiment, both proviso (1) and proviso (2) are true such that the (A) unsaturated compound also includes at least one silicon-bonded hydrogen atom per molecule, and the composition further comprises (B) a silicon hydride compound including at least one silicon-bonded hydrogen atom per molecule. Examples of suitable unsaturated compounds and silicon hydride compounds for this third embodiment are set forth above.

The (A) unsaturated compound, as well as the (B) silicon hydride compound, if present in the composition, may be disposed in a carrier vehicle. Examples of carrier vehicles are described.

The composition may comprise the (A) unsaturated compound and the (B) silicon hydride compound, when present, in varying amounts or ratios contingent on desired properties or end use application of the composition. In various embodiments when the composition comprises components (A) and (B), the composition comprises components (A) and (B) in an amount to provide a mole ratio of silicon-bonded hydrogen atoms to aliphatically unsaturated groups of from 0.3 to 5, alternatively from 0.6 to 3.

The composition further comprises (C) the catalyst and/or ($C^1$) the redox-switchable catalyst system. The (C) catalyst and/or the ($C^1$) redox-switchable catalyst system may be present as the catalytic reaction product formed when converting the ($C^1$) redox-switchable catalyst system to the (C) catalyst, as described above.

The (C) catalyst and the ($C^1$) redox-switchable catalyst system are described above. When the composition comprises the ($C^1$) redox-switchable catalyst system, the (C) catalyst is formed in situ, prior to and/or contemporaneous with formation of the composition depending on when the reducing compound is incorporated.

The (C) catalyst and/or the ($C^1$) redox-switchable catalyst system is present in the composition in a catalytic amount, i.e., an amount or quantity sufficient to promote a reaction or curing thereof at desired conditions. The catalytic amount of the (C) catalyst and/or the ($C^1$) redox-switchable catalyst system may be greater than 0.01 ppm, and may be greater than 1,000 ppm (e.g., up to 10,000 ppm or more). In certain embodiments, the typical catalytic amount of (C) catalyst and/or the ($C^1$) redox-switchable catalyst system is less than 5,000 ppm, alternatively less than 2,000 ppm, alternatively less than 1,000 ppm (but in any case greater than 0 ppm). In specific embodiments, the catalytic amount of the (C) catalyst and/or the ($C^1$) redox-switchable catalyst system may range from 0.01 to 1,000 ppm, alternatively 0.01 to 100 ppm, and alternatively 0.01 to 50 ppm of metal based on the weight of the composition. The ranges may relate solely to the metal content within the (C) catalyst and/or the ($C^1$) redox-switchable catalyst system.

The composition may further comprise one or more optional components, including adhesion promoters, carrier vehicles, dyes, pigments, anti-oxidants, heat stabilizers, flame retardants, flow control additives, biocides, fillers (including extending and reinforcing fillers), surfactants, thixotroping agents, water, carrier vehicles or solvents, pH buffers, etc. The composition may be in any form and may be incorporated into further compositions, e.g. as a component of a composition. For example, the composition may be in the form of, or incorporated into, an emulsion. The emulsion may be an oil-in-water emulsion, water-in-oil emulsion, silicone-in-oil emulsion, etc. The composition itself may be a continuous or discontinuous phase of such an emulsion.

Suitable carrier vehicles are described above.

The composition may be prepared by combining components (A), (B), (C), and/or ($C^1$), along with any optional components, in any order of addition, optionally with a master batch, and optionally under shear.

A method of preparing a hydrosilylation reaction product is also provided. The hydrosilylation reaction product is formed from the composition and may take a variety of forms depending on a section of the components in the composition.

The method comprises reacting an aliphatically unsaturated group and a silicon-bonded hydrogen atom in the presence of ($C^2$) a hydrosilylation catalyst to give the hydrosilylation reaction product. The ($C^2$) hydrosilylation catalyst is the (C) catalyst described above or is formed from the ($C^1$) redox-switchable catalyst system, e.g. in situ. The hydrosilylation reaction product is formed by an addition reaction between the silicon-bonded hydrogen atom and the aliphatically unsaturated group. As understood in the art, the hydrosilylation reaction can be generally represented, in the case of a double bond and in the presence of the ($C^2$) hydrosilylation catalyst, —Si—H+C═C→—Si—$CH_2$—$CH_2$—. The ($C^2$) hydrosilylation catalyst and inventive method can be utilized in any hydrosilylation reaction, e.g. in lieu of or in addition to conventional hydrosilylation catalysts.

The aliphatically unsaturated group is present in the (A) unsaturated compound. At least one of the following two provisos applies: (1) the (A) unsaturated compound also includes at least one silicon-bonded hydrogen atom per molecule; and/or (2) the silicon-bonded hydrogen atom is present in the (B) silicon hydride compound separate from the (A) unsaturated compound. In a first embodiment, the proviso (1) is true such that the (A) unsaturated compound also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the (A) unsaturated compound also includes at least one silicon-bonded hydrogen atom per molecule, and that the composition further comprises the (B) silicon hydride compound including at least one silicon-bonded hydrogen atom per molecule. These embodiments are described in detail above with respect to the composition itself.

The hydrosilylation-reaction product prepared via the method is not limited and is generally a function of the (A) unsaturated compound and, if utilized, the (B) silicon hydride compound. For example, the hydrosilylation-reaction product may be monomeric, oligomeric, polymeric, resinous, etc. The hydrosilylation-reaction product may comprise a fluid, an oil, a gel, an elastomer, a rubber, a resin, etc. The hydrosilylation-reaction product may take any form, as understood in the art, based on the selection of the (A) unsaturated compound and, if utilized, the (B) silicon hydride compound.

By way of example only, below are two reaction mechanisms that may be utilized via the inventive method. In these two reaction mechanisms, the method utilizes 1-octene as the (A) unsaturated compound and two different (B) silicon hydride compounds. The catalyst is the (C) catalyst described above, which can be utilized discretely or formed in situ from the redox-switchable catalyst system:

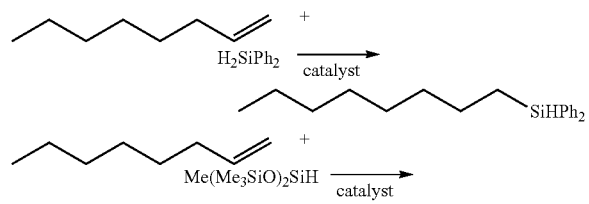

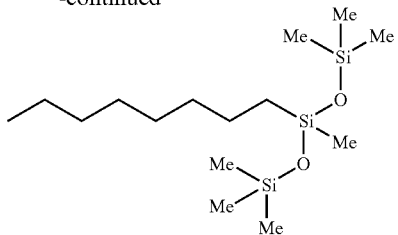

In the reaction mechanisms above, Ph is phenyl and Me is methyl. One of skill in the art understands how the (A) unsaturated compound and, if utilized, the (B) silicon hydride compound may be selected based on a desired target species of the hydrosilylation-reaction product.

The method may be utilized to prepare hydrosilylation-reaction products in the form of functionalized, e.g. olefin functionalization, silanes or siloxanes. Such functionalized silanes or siloxanes may be utilized in other end use applications, e.g. as a discrete component in another composition, including a curable composition, a personal care or cosmetic composition, etc.

The hydrosilylation-reaction product may also include various byproducts formed via the hydrosilylation reaction. For example, the hydrosilylation-reaction product typically includes a target species and various byproducts. The hydrosilylation-reaction product may also include other components, e.g. a carrier or solvent, if the method and reaction is carried out therein and/or if the composition includes such components. The method may further comprise isolating the target species, e.g. via any suitable purification method.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The following examples are intended to illustrate the invention and are not to be viewed in any way as limiting to the scope of the invention.

The various components utilized in the Examples are set forth in Table 1 below.

TABLE 1

Components/Compounds Utilized

| Component | Description |
| --- | --- |
| Starting Material (I) | [Rh(C$_2$H$_4$)$_2$Cl]$_2$ |
| Starting Material (II) | 2-(Diphenylphosphino)anisole 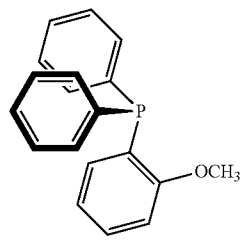 |

TABLE 1-continued

Components/Compounds Utilized

| Component | Description |
|---|---|
| Catalyst | $(Ph_2PAn)_2Rh^ICl$ |

[structure diagram]

where Ph indicates phenyl.

| Comparative Catalyst | Cyclooctadiene rhodium chloride dimer $[RhCl(cod)]_2$ |
|---|---|
| Redox-switchable Catalyst | $[(Ph_2PAn)_2Rh^{III}Cl_2][BAr^F_4]$ |

[structure diagram]

where Ph indicates phenyl, and $BAr^F_4$ is tetrakis[3,5-bis(trifluoromethyl)phenyl]borate.

| Initial Material (I) | $(Ph_2PAn)_2RhCl_3$ |
|---|---|

[structure diagram]

where Ph indicates phenyl.

| Initial Material (II) | Sodium tetrakis[3,5-bis(trifluoromethyl)phenyl]borate $(NaBAr_4^F)$. |
|---|---|
| Reducing Compound 1 | Cobaltocene |
| Reducing Compound 2 | Sodium triethylborohydride |
| Reducing Compound 3 | Tetrakis(dimethylamino)ethylene (TDAE) |
| (A1) Unsaturated Compound | Vinylpentamethyldisiloxane |
| (A2) Unsaturated Compound | 1-octene |
| (A3) Unsatuated Compound | $CH_2=CHSi(Me_2)(OSiMe_2)_5SiMe_2CH=CH_2$, where Me indicates methyl. |
| (A4) Unsaturated Compound | Dimethylvinylsiloxy-terminated dimethyl siloxane having a degree of polymerization of from 800 to 1,000. |
| (B1) Silicon Hydride Compound | 1,1,1,3,5,5,5-heptamethyltrisiloxane (MD'M, where M is $(CH_3)_3SiO_{1/2}$ and D' is $CH_3(H)SiO_{2/2}$). |

TABLE 1-continued

Components/Compounds Utilized

| Component | Description |
|---|---|
| (B2) Silicon Hydride Compound | $HSiMe_2Ph$, where Me indicates methyl and Ph indicates phenyl. |
| (B3) Silicon Hydride Compound | $HSi(Me_2)(OSiMe_2)_{20}SiMe_2H$, where Me indicates methyl. |
| (B4) Silicone Hydride Compound | A trimethylsiloxy-terminated polydimethylsiloane polymethylhydrogensiloxane copolymer having a viscosity at 25° C. of 5 mPa•S and a Si—H concentration of 0.76%. |

Rheological measurements described below were performed on an DHR-3 rheometer from TA instrument. Each testing material was placed on an Advanced Peltier plate (lower geometry) with solvent trap. A 25 mm parallel plate was used as upper geometry. Temperature was controlled via a Peltier system to within ±0.02 C. Test parameters: Strain oscillatory; Strain %: 1%, Frequency: 1 Hz.

Preparation Example 1: Synthesis of Catalyst

In a drybox, a solution of Starting Material (II) (1.100 g, 3.770 mmol, 4.0 equiv.) in about 10 mL of benzene was added dropwise to a 100 mL round bottom flask containing a solution of Starting Material (1) (367 mg, 0.944 mmol, 1.0 equiv.) in about 15 mL of benzene to give a mixture. After the mixture had been stirred for 30 min., a resulting deep red-orange solution was filtered through Celite to give a filtrate. The volume of the filtrate was reduced in vacuo until the appearance of significant amount of precipitate. The precipitate was collected by filtration as a light pink-orange powder and was dried in vacuo. Yield: 1.309 g, 96%. $^1H$ NMR (500 MHz, $C_6D_6$; δ, ppm): 7.77 (br, 8H), 6.96 (t, J=7.5 Hz, 4H), 6.91 (t, J=7.5 Hz, 8H), 6.62 (t, J=6.5 Hz, 2H), 6.23 (d, J=7.5 Hz, 2H), 3.45 (br, 6H). $^{31}P\ \{^1H\}$ NMR (202 MHz, $C_6D_6$; δ, ppm): 52.48 (d, JRh-P=204.4 Hz). Single crystals suitable for X-ray crystallographic analysis were grown from supersaturated THF solution of catalyst at room temperature.

Preparation Example 2: Synthesis of Catalyst

In a drybox, Starting Material (1) (50 mg, 0.129 mmol, 1.0 equiv.) and Starting Material (II) (115 mg, 0.514 mmol, 4.0 equiv.) were loaded in a 20-mL reaction vial. About 10 mL of THF was added. After stirring at room temperature for 1 hour, the THF was removed to give a resultant. The resultant was washed with diethyl ether to give a solid residue. The solid residue was re-dissolved in THF and THF was allowed to slowly evaporate, resulting in dark maroon crystals. The crystals were filtered and was dried in vacuo (Yield: 72 mg, 48%). $^1H$ NMR (400 MHz, $CD_2Cl_2$, room temperature) δ 7.59 (br, 2H), 7.35 (t, J=7.8 Hz, 2H), 6.98 (t, J=7.4 Hz, 4H), 4.07 (br, 6H), 2.32 (br, 4H), 1.58-0.80 (m, 24H). $^{31}P$ NMR (202 MHz, $C_6D_6$, room temperature) δ 73.50 (d(br), J~240 Hz), 60.25 (d(br), J~183 Hz). Single crystals suitable for X-ray crystallographic analysis were grown from supersaturated THF solution of catalyst at room temperature.

Preparation Example 3: Synthesis of Redox-Switchable Catalyst

Solid Initial Material (I) (52 mg, 0.066 mmol, 1.0 equiv.) and Initial Material (II) (61 mg, 0.069 mmol, 1.05 equiv.) were loaded in a 20-mL vial. About 3 mL of $Et_2O$ was disposed in the vial to give a yellow suspension. The yellow suspension was stirred for 1 h to give a reaction product. The reaction product was orange and almost homogeneous. The reaction product was filtered through Celite to give a filtrate. Slow evaporation of the filtrate gave orange crystals. 1H NMR (500 MHz, $C_6D_6$; δ, ppm): 8.44 (br, 8H), 7.63 (br, 4H), 7.07-6.98 (m, 6H), 6.97-6.90 (m; 8H), 6.87-6.80 (m, 8H), 6.76-6.70 (m, 2H), 6.66-6.59 (m, 4H), 3.63 (s, 6H). $^{13}C\ \{^1H\}$ NMR (125 MHz, $C_6D_6$; δ, ppm): 162.82 (q, JB-C=49.5 Hz), 161.69 (dd, J=3.3 Hz), 135.45, 135.39, 134.62 (dd, J=4.8 Hz), 133.73, 133.24, 129.98 (qm, J=31.8 Hz), 128.88 (dd, J=6.0 Hz), 126.34, 125.67-124.98 (m), 124.49 (dd, J=4.3 Hz), 124.17, 122.01, 119.29-118.58 (m), 118.15 (sept, J=3.9 Hz), 115.88 (dd, J=3.8 Hz), 62.34. $^{31}P\ \{^1H\}$ NMR (202 MHz, $C_6D_6$; δ, ppm): 37.41 (d, JRh-P=132.5 Hz, 2P). Single crystals suitable for X-ray crystallographic analysis were grown from supersaturated $Et_2O$ solution.

Example 1: Hydrosilylation Catalyzed with Catalyst

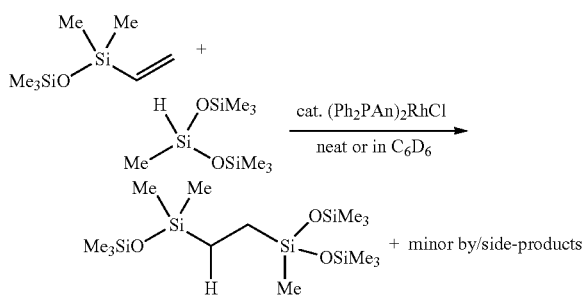

In a drybox, a reaction vial was charged with 1,3,5-trimethoxybenzene, (A1) Unsaturated Compound (2.00 g, 11.47 mmol, 1 equiv.), Catalyst (0.083 mg, 0.115 μmol, 0.00001 equiv, from stock solution) and (B1) Silicon Hydride (2.55 g, 11.47 mmol, 1 equiv.) to give a mixture. The mixture was brought out of the drybox, connected to argon atmosphere of a Schlenk line and placed in a pre-heated oil bath (80° C.). Aliquots of reaction mixture were taken at certain time points as shown below in order to monitor the reaction progression, which was analyzed by 1H NMR spectroscopy and the conversion of the starting materials are based on 1,3,5-trimethoxybenze. Example 1 is repeated with different curing conditions. In particular, Example 1 is carried at 80° C. under an inert (nitrogen) atmosphere using neat substrates, at room temperature under an inert (nitrogen) atmosphere using neat substrates, and at 80° C. under an inert (nitrogen) atmosphere in $C_6D_6$ solvent (0.057 mmol scale for both substrates, 0.0005 equiv of catalyst, 0.6 mL $C_6D_6$ solvent). Tables 2-4 below show the conversion under various reaction conditions over time as specified. In Table 2, the time is measured in hours; in Table 3, the time is measured in days; in Table 4, the time is measured in minutes.

TABLE 2

80° C. (neat)

| | Time (h) | | | | | |
|---|---|---|---|---|---|---|
| | 1 | 2 | 3 | 4 | 5 | 6 |
| Conv. (%) | 0 | 0 | 1 | 7 | 65 | 100 |

TABLE 3

RT (neat)

| | Time (d) | | | | |
|---|---|---|---|---|---|
| | 1 | 2 | 3 | 4 | 6 |
| Conv. (%) | 0 | 0 | 0 | 0 | 0 |

TABLE 4

80° C. (in $C_6D_6$)

| | Time (min) | | | | | | |
|---|---|---|---|---|---|---|---|
| | 6 | 12 | 18 | 25 | 32 | 42 | 53 | 61 |
| Conv. (%) | 0 | 0 | 2 | 0 | 0 | 0 | 5 | 12 |

| | Time (min) | | | | | |
|---|---|---|---|---|---|---|
| | 69 | 78 | 89 | 107 | 129 | 156 | 188 |
| Conv. (%) | 29 | 39 | 56 | 73 | 84 | 90 | 94 |

Example 2: Hydrosilylation Catalyzed with Redox-Switchable Catalyst System

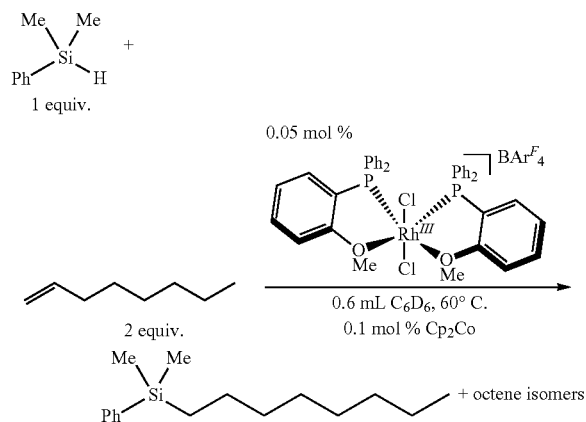

In a drybox, (A2) Unsaturated Compound (17.87 mg, 159.24 μmol, 2 equiv), Redox-switchable Catalyst (0.065 mg, 4.00×10$^{-8}$ mol, 0.0005 equiv, from a stock solution), Silicon Hydride Compound (B2) (10.85 mg, 79.62 μmol, 1 equiv), 1,3,5-trimethoxybenzene, and 0.6 mL of deuterated benzene ($C_6D_6$) were loaded into a J-Young NMR tube. After a period of time in a 60° C. pre-heated oil bath, the NMR tube was returned to the drybox and Reducing Compound 1 (16 μg, 0.001 equiv., 0.1 mol %) was added to the mixture. Upon addition of the Reducing Compound 1, the Redox-switchable Catalyst was observed to undergo a formal change in oxidation state and convert to the Catalyst in situ, and a significant increase in conversion resulted. The results are below in Table 5, showing yield as a function of time.

TABLE 5

| Time (min) | Yield of the anti-Markovnikov product (%) | Silane conversion (%) |
|---|---|---|
| 3 | 0 | 0 |
| 19 | 4 | 3 |
| 35[1] | 7 | 6 |
| 60 | 32 | 33 |
| 80 | 38 | 41 |
| 99 | 42 | 43 |
| 121 | 46 | 46 |
| 175 | 53 | 53 |

[1]Reducing Compound 1 added.

Example 3: Hydrosilylation Catalyzed with Redox-Switchable Catalyst System

In a drybox, (A2) Unsaturated Compound (17.87 mg, 159.24 μmol, 2 equiv), Redox-switchable Catalyst (0.065 mg, 4.00×10$^{-8}$ mol, 0.0005 equiv, from a stock solution), Silicon Hydride Compound (B2) (10.85 mg, 79.62 μmol, 1 equiv), 1,3,5-trimethoxybenzene, and 0.6 mL of deuterated benzene ($C_6D_6$) were loaded into a J-Young NMR tube. After a period of time in a 60° C. pre-heated oil bath, the NMR tube was returned to the drybox and Reducing Compound 2 (10 μg, 0.001 equiv.) was added to the mixture. Upon addition of the Reducing Compound 2, the Redox-switchable Catalyst was observed to undergo a formal change in oxidation state and convert to the Catalyst in situ, and a significant increase in conversion resulted. The results are below in Table 6, showing yield as a function of time.

TABLE 6

| Time (min) | Yield of the anti-Markovnikov product (%) | Silane conversion (%) |
|---|---|---|
| 4 | 0 | 0 |
| 24 | 1 | 6 |
| 52[1] | 2 | 15 |
| 76 | 7 | 18 |
| 101 | 13 | 22 |
| 125 | 18 | 25 |
| 149 | 24 | 27 |
| 168 | 29 | 30 |

[1]Reducing Compound 2 added.

Example 4: Hydrosilylation Catalyzed with Redox-Switchable Catalyst System

In a drybox, (A2) Unsaturated Compound (17.87 mg, 159.24 μmol, 2 equiv.), Redox-switchable Catalyst (0.065 mg, 4.00×10$^{-8}$ mol, 0.0005 equiv., from a stock solution), Silicon Hydride Compound (B2) (10.85 mg, 79.62 μmol, 1 equiv.), 1,3,5-trimethoxybenzene, and 0.6 mL of deuterated benzene ($C_6D_6$) were loaded into a J-Young NMR tube. After a period of time in a 60° C. pre-heated oil bath, the NMR tube was returned to the drybox and Reducing Compound 3 (16 µg, 0.001 equiv.) was added to the mixture. Upon addition of the Reducing Compound 3, the Redox-switchable Catalyst was observed to undergo a formal change in oxidation state and convert to the Catalyst in situ, and a significant increase in conversion resulted. The results are below in Table 7, showing yield as a function of time.

TABLE 7

| Time (min) | Yield of the anti-Markovnikov product (%) | Silane conversion (%) |
|---|---|---|
| 3 | 2 | 0 |
| 25 | 3 | 6 |
| 48[1] | 4 | 7 |
| 76 | 35 | 34 |
| 102 | 44 | 44 |
| 124 | 50 | 49 |
| 146 | 54 | 53 |

[1]Reducing Compound 3 added.

Example 5: Hydrosilylation of Organopolysiloxanes

In a drybox, a 20-mL reaction vial was charged with (A3) Unsaturated Compound (1.00 g, 1 equiv.), Catalyst (13 µg, 0.001 mol % to give 10 ppm mol Rh) and (B3) Silicon Hydride Compound (2.90 g, 1 equiv.) to give a mixture. The mixture was brought out of the drybox, connected to argon atmosphere of a Schlenk line and placed in a pre-heated oil bath (80° C.). Aliquots of reaction mixture were taken at certain time points in order to monitor the reaction progression, which was then analyzed by $^1$H NMR spectroscopy and the conversion of the starting materials are based on consumption of unsaturation. Example 5 is repeated with different curing conditions. In particular, Example 5 is carried at 40° C., and at 80° C., under an inert (nitrogen) atmosphere. Table 8 below shows the conversion.

TABLE 8

| | Conversion of Example 5: | | |
|---|---|---|---|
| Temp: | 30 min | 4 hours | 24 hours |
| 40° C. | 0 | 0 | 2% |
| 80° C. | 2% | 13% | 100% |

Example 6: Hydrosilylation of Organopolysiloxanes

In a nitrogen-filled drybox, a 20-mL reaction vial was charged with (A4) Unsaturated Compound (10.00 g), Catalyst (0.4 mg, 40 µL in THF), and (B4) Silicon Hydride Compound (0.96 g) to give a mixture. The mixture was manually stirred for about 200 revolutions. The mixture was brought out of the drybox and placed in a dry ice filled dewar before rheological measurements. At rheometer, a part of the sample (about 1 g) was transferred onto a Peltier plate under air. Experiment commenced with a pre-designed temperature switch procedure. The curing process was monitored in real time by rheometer. The results are shown in FIG. 1, which shows storage modulus, loss modulus, and temperature as a function of time (with the x axis being time in seconds). As shown in FIG. 1, the temperature increase resulted in a marked increase in reaction rate.

Example 7: Hydrosilylation of Organopolysiloxanes

Figure 2:
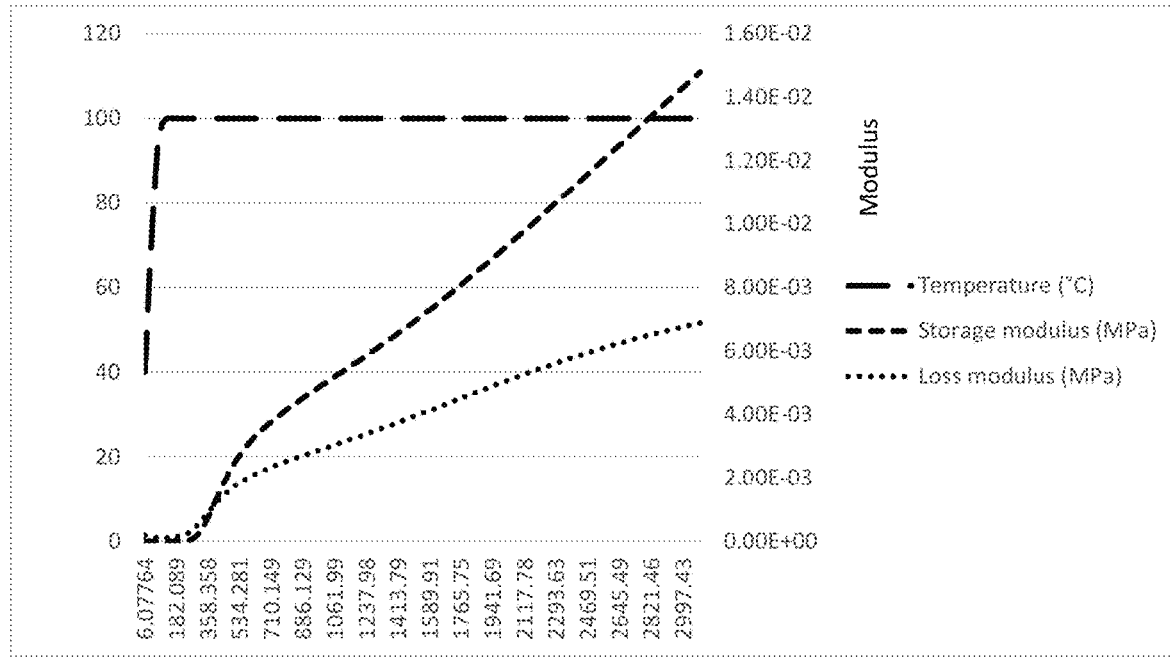
FIG. 2 shows storage modulus, loss modulus, and temperature as a function of time in connection with the curing process as monitored in real time by rheometer for Example 7.

In a nitrogen-filled drybox, a 20-mL reaction vial was charged with (A4) Unsaturated Compound (2.5 g), Catalyst (0.4 mg, 8.2 µL in THF), and (B4) Silicon Hydride Compound (0.24 g) to give a mixture. The mixture was manually stirred for about 200 revolutions. The mixture was brought out of the drybox and placed in a dry ice filled dewar before rheological measurements. At rheometer, a part of the sample (about 1 g) was transferred onto the Peltier plate under air. The curing process was monitored in real time by rheometer. The results are shown in FIG. 2, which shows storage modulus, loss modulus, and temperature as a function of time (with the x axis being time in seconds). Unlike in Example 6, there was no temperature switch or increase utilized in Example 7.

Comparative Example 1: Hydrosilylation of Organopolysiloxanes

Figure 3:
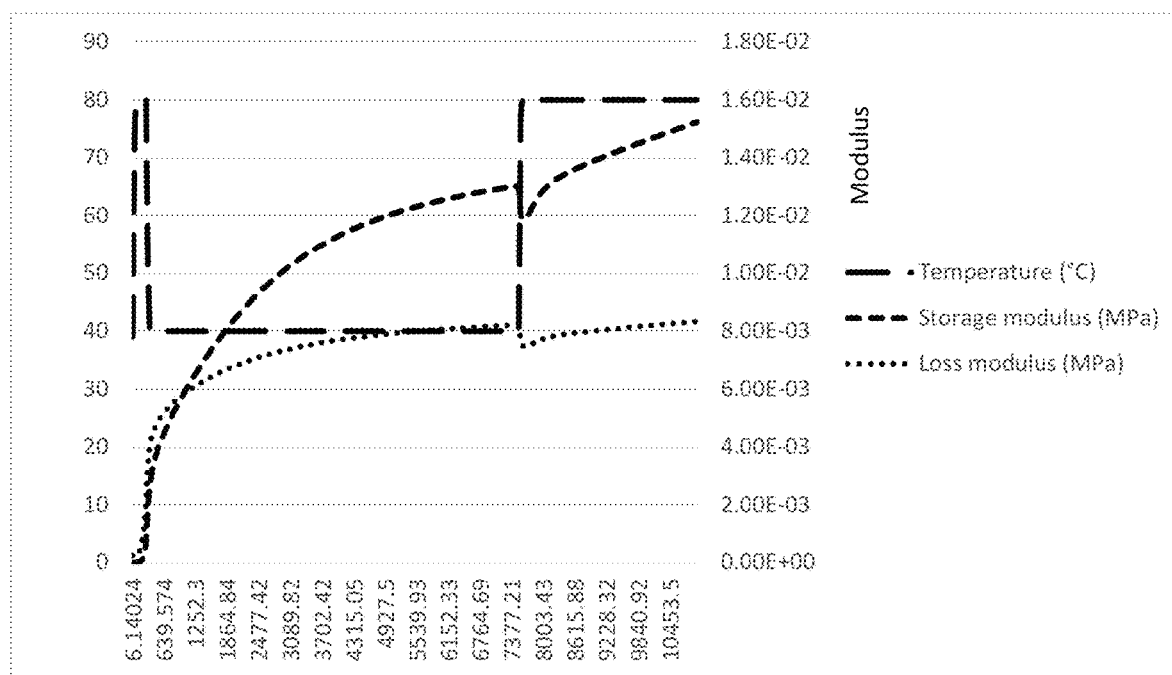
FIG. 3 shows storage modulus, loss modulus, and temperature as a function of time in connection with the curing process as monitored in real time by rheometer for Comparative Example 1.

In a nitrogen-filled drybox, a 20-mL reaction vial was charged with (A4) Unsaturated Compound (5.2 g), Comparative Catalyst (71 µg, 7.1 µL in THF), and (B4) Silicone Hydride Compound (0.499 g) to give a mixture. The mixture was manually stirred for about 200 revolutions. The sample was brought out of the drybox and placed in a dry ice filled dewar before rheological measurements. At rheometer, a part of the sample (about 1 g) was transferred onto the Peltier plate under air. The curing process was monitored in real time by rheometer. The results are shown in FIG. 3, which shows storage modulus, loss modulus, and temperature as a function of time (with the x axis being time in seconds). As shown in FIG. 3, and unlike in Example 6, the temperature increase in Comparative Example 1 did not result in a marked increase in reaction rate.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

What is claimed is:
1. A catalyst for hydrosilylation, said catalyst comprising a complex having the following formula:

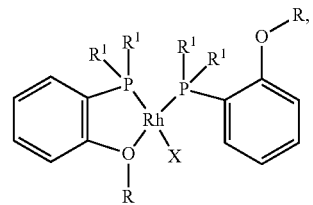

wherein each R is an independently selected hydrocarbyl group, each $R^1$ is an independently selected aryl group, and X is a halogen atom.

2. The catalyst of claim 1, wherein: (i) each R is methyl; (ii) each $R^1$ is phenyl; (iii) each X is Cl; or (iv) any combination of (i) to (iii).

3. A redox-switchable catalyst system for preparing the catalyst of claim 1, said redox-switchable catalyst system comprising:
a redox-switchable catalyst comprising a complex having the following formula:

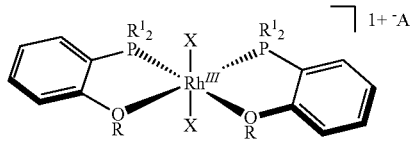

wherein each R is an independently selected hydrocarbyl group, each $R^1$ is an independently selected aryl group, each X is a halogen atom, and A is a counter anion; and a reducing compound.

4. The redox-switchable catalyst system of claim 3, wherein: (i) each R is methyl, and each $R^1$ is phenyl, and each X is Cl; (ii) the counter anion A is tetrakis[3,5-bis(trifluoromethyl)phenyl]borate; (iii) the reducing compound comprises cobaltocene; or (iv) any combination of (i) to (iii).

5. A method of preparing a catalyst for hydrosilylation, said method comprising:
reducing a redox-switchable catalyst with a reducing compound to give the catalyst,
wherein the redox-switchable catalyst comprises a complex having the following formula:

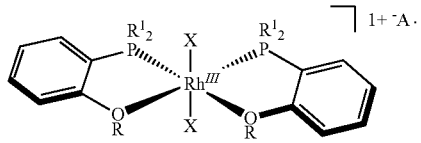

wherein each R is an independently selected hydrocarbyl group, each $R^1$ is an independently selected aryl group, each X is a halogen atom, and A is a counter anion; and wherein the catalyst is the catalyst of claim 1.

6. The method of claim 5, wherein: (i) each R is methyl, each $R^1$ is phenyl, and each X is Cl; (ii) the counter anion A is tetrakis[3,5-bis(trifluoromethyl)phenyl]borate; (iii) the reducing compound comprises cobaltocene; or (iv) any combination of (i) to (iii).

7. A method of preparing a catalyst for hydrosilylation, said method comprising:
complexing starting material (I) of formula $[RhR^2{}_2X]_2$ and starting material (II) of formula

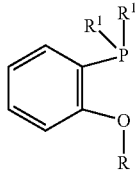

to give the catalyst;

wherein each $R^2$ is an independently selected aliphatically unsaturated group, each X is an independently selected halogen atom, R is a hydrocarbyl group, and each $R^1$ is an independently selected aryl group;
wherein the catalyst for hydrosilylation is the catalyst of claim 1.

8. A composition, comprising:
(A) an unsaturated compound including at least one aliphatically unsaturated group per molecule, subject to at least one of the following two provisos:
(1) the (A) unsaturated compound also includes at least one silicon-bonded hydrogen atom per molecule; and/or
(2) the composition further comprises (B) a silicon hydride compound including at least one silicon-bonded hydrogen atom per molecule; and
(C) the catalyst of claim 1.

9. The composition of claim 8, wherein proviso (2) is true such that composition further comprises (B) the silicon hydride compound including at least one silicon-bonded hydrogen atom per molecule.

10. The composition of claim 9, wherein: (i) the (A) unsaturated compound includes at least two unsaturated groups per molecule; (ii) the (B) silicon hydride compound includes at least two silicon-bonded hydrogen atoms per molecule; or (iii) both (i) and (ii).

11. A method of preparing a hydrosilylation reaction product, said method comprising:
reacting an aliphatically unsaturated group and a silicon-bonded hydrogen atom in the presence of ($C^2$) a hydrosilylation catalyst to give the hydrosilylation reaction product;
wherein the aliphatically unsaturated group is present in (A) an unsaturated compound; wherein at least one of the following two provisos applies:
(1) the (A) unsaturated compound also includes at least one silicon-bonded hydrogen atom per molecule; and/or
(2) the silicon-bonded hydrogen atom is present in (B) a silicon hydride compound separate from the (A) unsaturated compound; and
wherein the ($C^2$) hydrosilylation catalyst comprises the catalyst of claim 1.

12. The hydrosilylation reaction product formed in accordance with the method of claim 11.

13. A composition, comprising:
(A) an unsaturated compound including at least one aliphatically unsaturated group per molecule, subject to at least one of the following two provisos:
(1) the (A) unsaturated compound also includes at least one silicon-bonded hydrogen atom per molecule; and/or
(2) the composition further comprises (B) a silicon hydride compound including at least one silicon-bonded hydrogen atom per molecule; and
($C^1$) the redox-switchable catalyst system of claim 3.

14. A method of preparing a hydrosilylation reaction product, said method comprising:
reacting an aliphatically unsaturated group and a silicon-bonded hydrogen atom in the presence of ($C^2$) a hydrosilylation catalyst to give the hydrosilylation reaction product;
wherein the aliphatically unsaturated group is present in (A) an unsaturated compound; wherein at least one of the following two provisos applies:
(1) the (A) unsaturated compound also includes at least one silicon-bonded hydrogen atom per molecule; and/or (2) the silicon-bonded hydrogen atom is present in (B) a silicon hydride compound separate from the (A) unsaturated compound; and wherein the ($C^2$) hydrosilylation catalyst is formed in situ from the redox-switchable catalyst system of claim 4.

15. The hydrosilylation reaction product formed in accordance with the method of claim 14.

16. A catalytic reaction product formed from the redox-switchable catalyst system of claim 3.

* * * * *